United States Patent [19]

Funakiri

[11] Patent Number: 5,544,142
[45] Date of Patent: Aug. 6, 1996

[54] DISK DRIVE WITH DUST SHIELD COVER

[75] Inventor: Atsushi Funakiri, Kanagawa, Japan

[73] Assignee: Sony Corporation, Tokyo, Japan

[21] Appl. No.: 391,613

[22] Filed: Feb. 21, 1995

Related U.S. Application Data

[63] Continuation of Ser. No. 195,789, Feb. 10, 1994, abandoned.

[30] Foreign Application Priority Data

Feb. 15, 1993 [JP] Japan .................................. 5-025468

[51] Int. Cl.⁶ .......................... G11B 33/14; G11B 33/02
[52] U.S. Cl. ...................... 369/75.1; 360/97.02; 360/137
[58] Field of Search ............................... 369/77.2, 77.1,
369/75.1; 360/97.02, 137; 312/8.12, 9.1,
9.9; 220/DIG. 21; 206/307, 308.1, 308.3

[56] References Cited

U.S. PATENT DOCUMENTS 4,697,854  10/1987  Lunsford .................................. 312/223
5,151,457  9/1992  Ishida et al. ............................. 524/157

FOREIGN PATENT DOCUMENTS 59-101078  6/1984  Japan .................................. 360/97.02
60-85796   6/1985  Japan .
2-260191   10/1990 Japan .
4-274079   9/1992  Japan .
9209072    5/1992  WIPO .................................. 360/97.01

*Primary Examiner*—Stuart S. Levy
*Assistant Examiner*—William J. Klimowicz
*Attorney, Agent, or Firm*—Limbach & Limbach, L.L.P.

[57] ABSTRACT

An arrangement comprises a disk drive, an electromagnetic shield cover disposed over the disk drive, and a dust shield cover interposed between the disk drive and the electromagnetic shield cover.

20 Claims, 6 Drawing Sheets

DISK DRIVE WITH DUST SHIELD COVER

This is a continuation of application Ser. No. 08/195,789, filed Feb. 10, 1994 now abandoned.

BACKGROUND OF THE INVENTION

The present invention relates generally to a disk drive and more particularly, to a dust shield cover for a disk drive.

A microfloppy disk drive includes a cassette holder mounted on a chassis to be movable up and down by an up-down guide. An example of the microfloppy disk drive is disclosed, for example, in U.S. Pat. No. 5,400,198 filed Jan. 16, 1991.

The microfloppy disk drive is generally covered by an electromagnetic shield cover for preventing electric noise. Due to existence of a hole, a clearance, etc. in the electromagnetic shield cover, there arises a problem that dust, etc. penetrate from the outside, and stick on a disk and a head, causing impossible recording and reproducing of signals.

Particularly, when mounting the disk drive to a work station of a computer for its utilization, dust, etc. could penetrate and stick thereon.

This is due to the following: In view of its heat detestation, the work station is constructed to provide a cooling fan which serves to introduce outside air for cooling heating parts such as a periphery of a power source, etc. With introduction of outside air into the disk drive from a cassette insertion opening of the cassette holder by the cooling fan, dust, etc. as contained in the outside air stick on the disk and the head.

Therefore, an object of the present invention is to provide a disk drive with a dust shield cover which enables a protection of a disk drive from dust, etc.

SUMMARY OF THE INVENTION

According to one aspect of the present invention, there is provided a dust shield cover for a disk drive, comprising:

side plates arranged to conceal the disk drive on both sides thereof;

a rear plate arranged to conceal the disk drive on the rear side thereof; and upper and lower plates arranged to conceal the disk drive on the upper and lower sides thereof.

According to another aspect of the present invention, there is provided, in an arrangement:

a disk drive;

an electromagnetic shield cover disposed over said disk drive; and a dust shield cover interposed between said disk drive and said electromagnetic shield cover, said dust shield cover comprising:

side plates arranged to conceal the disk drive on both sides thereof;

a rear plate arranged to conceal the disk drive on the rear side thereof; and upper and lower plates arranged to conceal the disk drive on the upper and lower sides thereof.

DETAILED DESCRIPTION OF THE INVENTION

Figure 1:
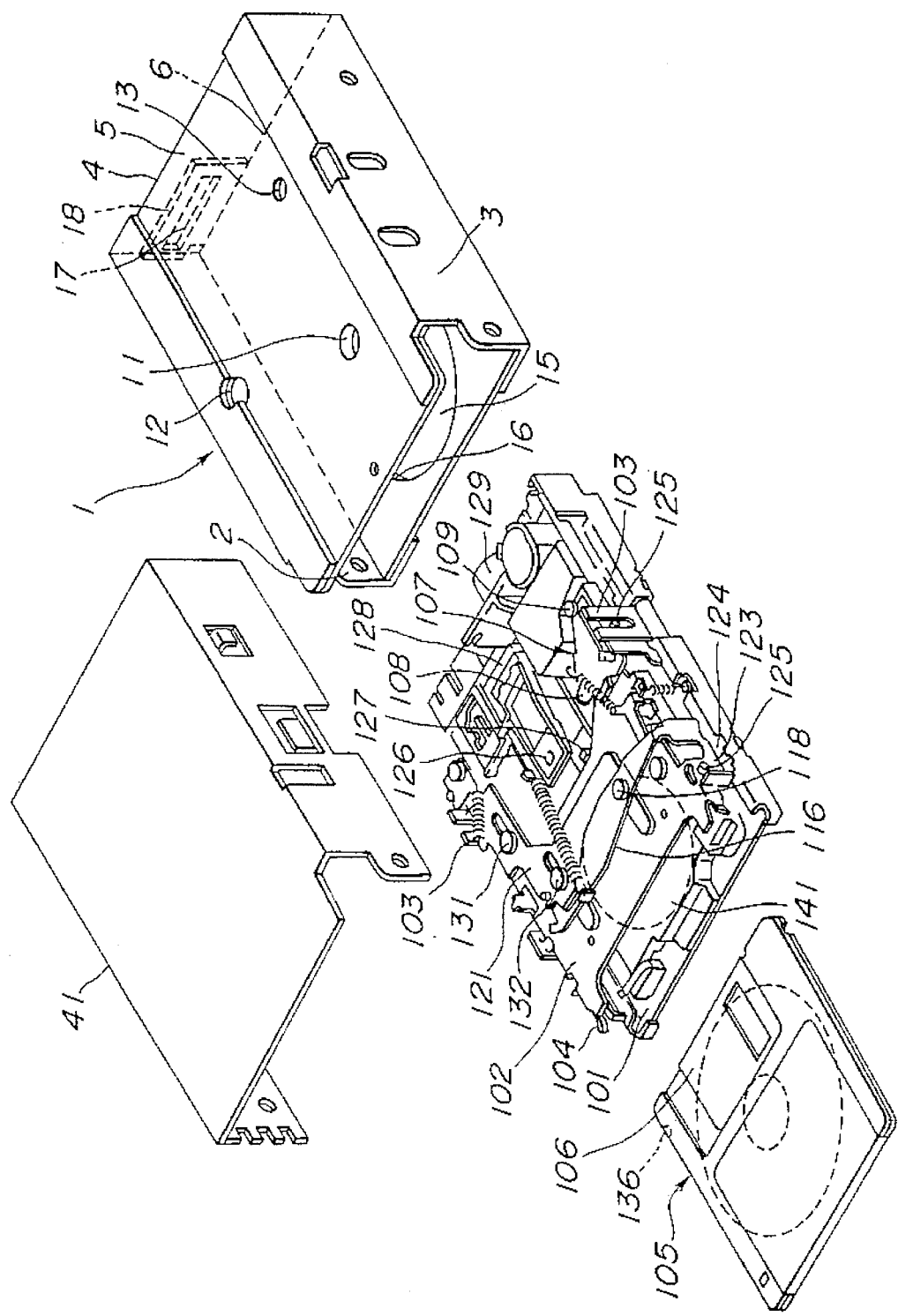
FIG. 1 is an exploded perspective view showing a disk drive and a dust shield cover which embodies the present invention.

Referring to FIG. 1, a microfloppy disk drive (refer hereinafter to as MFDD) includes a cassette holder 102 mounted on a chassis 101 to be movable up and down by up-down guides 103 . . . 103.

Figure 2:
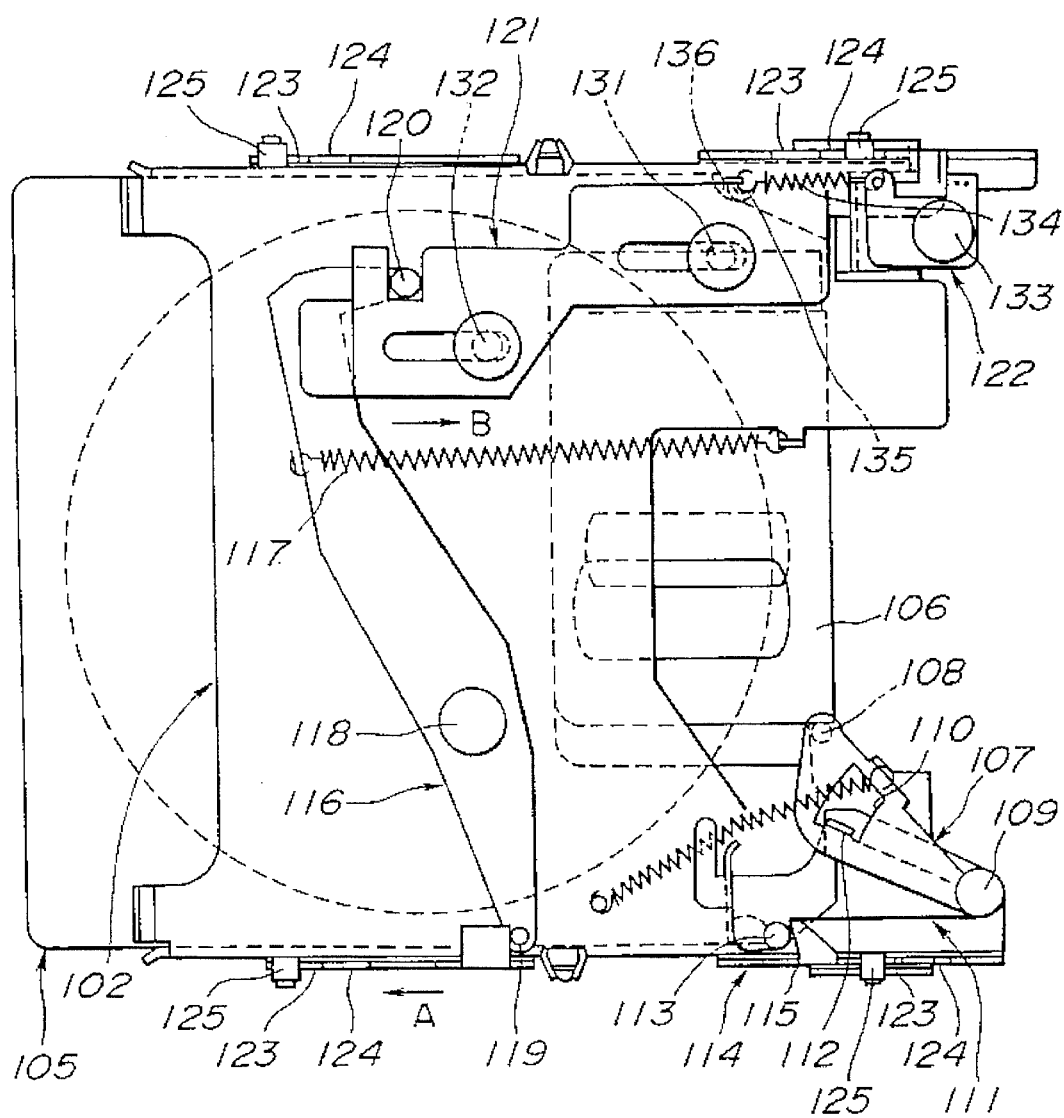
FIG. 2 is a plan view showing the disk drive.

Referring also to FIG. 2, when inserting a floppy disk cassette 105 from a cassette insertion opening 104 of the cassette holder 102, a shutter engaging pin 108 as arranged at an end of a shutter closing arm 107, which is rotatably disposed on an upper side of the cassette holder 102, is engaged with one side end of a shutter 106 of the floppy disk cassette 105.

The shutter closing arm 107 is pressed by the floppy disk cassette 105, and rotated clockwise as viewed in FIG. 1 about a shaft 109 to open the shutter 106.

When the shutter closing arm 107 is rotated clockwise as viewed in FIG. 1 by a predetermined angle, a tongue 112 of a slider stopper 111 is engaged with one side of a notch 110 of the shutter closing arm 107 as shown in FIG. 2, so that the slider stopper 111 is also rotated clockwise as viewed in FIG. about the shaft 109.

Figure 3:
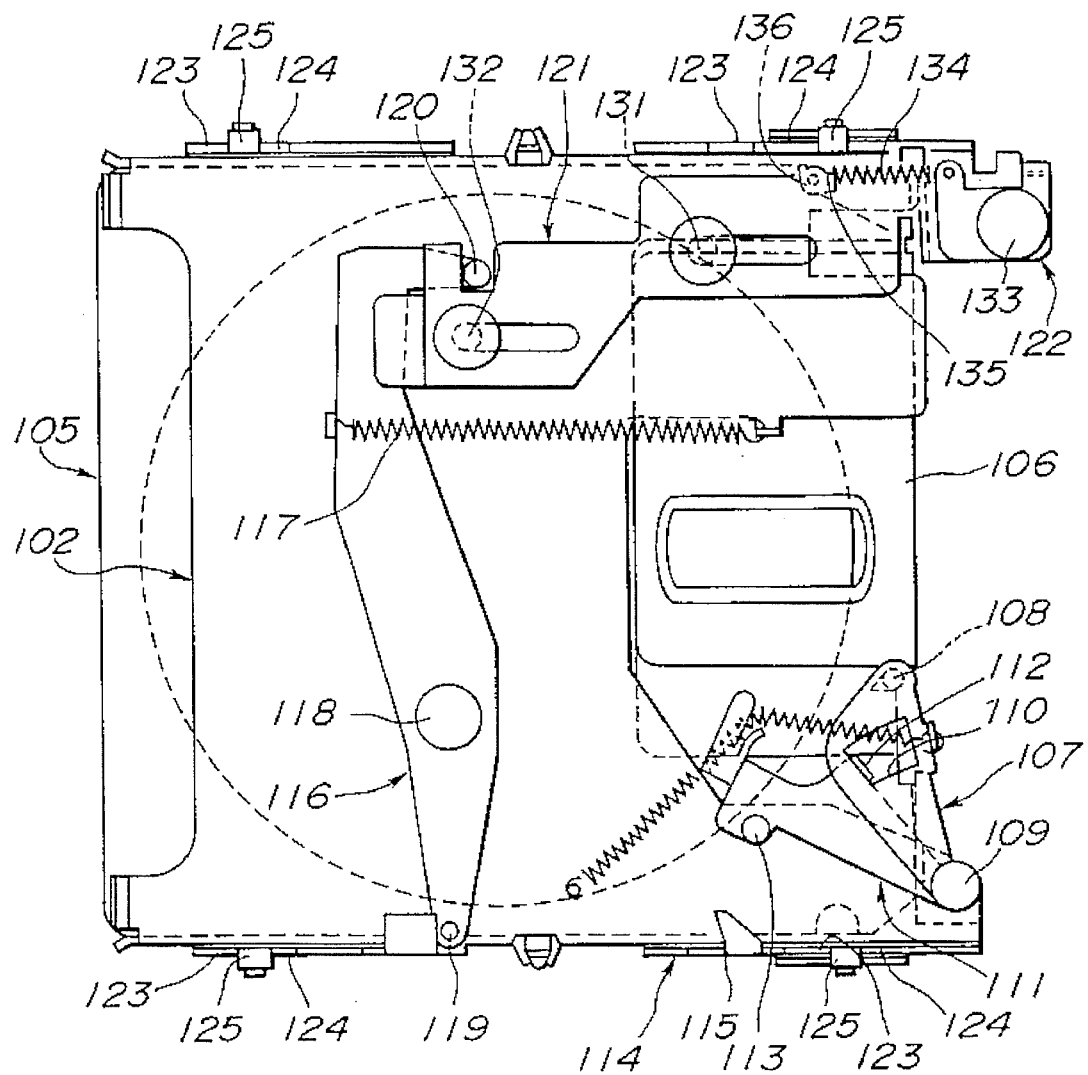
FIG. 3 is a view similar to FIG. 2, showing the disk drive.

Referring to FIG. 3, when the slider stopper 111 is rotated clockwise as viewed in FIG. 1, a stopper pin 113 as arranged at one end of the slider stopper 111 is disengaged with a pin engaging portion 115 of a slider or holder up-down operation panel 114.

When the stopper pin 113 is disengaged with the pin engaging portion 115, a slider driving lever 116 is rotated clockwise as viewed in FIG. 3 about a shaft 118 by force of a spring 117 for 1ever operation.

When the slider driving lever 116 is rotated clockwise as viewed in FIG. 3, the slider 114 is pressed by a pin 119 arranged at one end of the slider driving lever 116, and slid in the direction of an arrow A in FIG. 2, whereas a cassette withdrawing plate 121 is pressed by a pin 120 arranged at another end of the slider driving lever 116, and slid in the direction of an arrow B in FIG. 2.

When the cassette withdrawing plate 121 is slid in the direction of the arrow B in FIG. 2, the floppy disk cassette 105 is withdrawn in the cassette holder 102 by a cassette engaging member 122 arranged at an end of the cassette withdrawing plate 121.

On the other hand, when the slider 114 is slid in the direction of the arrow A in FIG. 2, rollers 125 . . . 125 as arranged on sides of the cassette holder 102 are slid down along slant faces of legs 123 . . . 123 arranged in four corners of the slider 114 so as to lower the cassette holder 102.

When the cassette holder 102 is lowered, a floppy disk as received in the cassette, holder 102 is chucked on a turn table, and has upper and lower faces held by upper and lower heads 126, 127 as shown in FIG. 1.

Then, a head carriage 128 providing the upper and lower heads 126, 127 is slid in the radial direction of the floppy disk by a stepping motor 129, etc., carrying out recording or reproducing.

Guide pins 131, 132 are arranged to slidably mount the cassette withdrawing plate 121 to the upper face of the cassette holder 102.

The cassette engaging member 122 is rotatably mounted to an end of the cassette withdrawing plate 121 by a shaft 133, and undergoes counterclockwise turning force from a coil spring 134, a cassette engaging pin 135 as arranged at an end thereof slightly entering the cassette holder 102 from the side thereof.

When inserting the floppy disk cassette 105 into the cassette holder 102 at a predetermined position, the cassette engaging pin 135 is engaged with a pin engaged portion 136 arranged on one side of the floppy disk cassette 105.

Referring to FIG. 1, a dust shield cover 1 is arranged for concealing the disk drive, and includes left and right side dust shield plates 2, 3 for covering the left and right sides, a rear dust shield plate 4 for covering the rear, and upper and lower dust shield plates 5, 6 for covering the upper and lower sides except the front in which the disk insertion opening 104 of the disk drive.

The side dust shield plates 2, 3, the rear dust shield plate 4, and the upper and lower dust shield plates 5, 6 are made of synthetic resin with antistatic finish.

Additionally, the dust shield plates 2–6 are connected to each other through adjacent portions thereof so as to define a flat box corresponding to the size of the disk drive, and has on one end side thereof an opening from which the disk drive can be inserted.

Referring also to FIGS. 5, 7, 8, and 10, the upper dust shield plate 5 is provided with first, second and third protrusions or swellings 11–13 which protrude inward or toward the lower dust shield plate 6.

The protrusions 11–13 are disposed at positions corresponding to non-slide portions of the disk drive such as the shaft 118 of the slider driving lever 116, the guide shaft 131 of the cassette withdrawing plate 121, the rotation center shaft 109 of the shutter closing arm 107, etc., i.e., portions other than slide portions such as the slider driving lever 118 and cassette withdrawing plate 121, or the shutter closing arm 107 and upper head 126, etc.

When the cassette holder 102 is moved upward upon ejecting, etc., heads of the shaft 118 of the slider driving lever 116, the guide shaft 131 of the cassette withdrawing plate 121, the shaft 109 of the shutter closing arm 107 come in contact with end faces of the protrusions 11–13, respectively, to press up the upper dust shield plate 5 which is prevented from contacting or interfering with the slider driving lever 116, the cassette withdrawing plate 121 and cassette withdrawing plate 121, or the shutter closing arm 107 and support arm of the upper head 126, etc.

Figure 6:
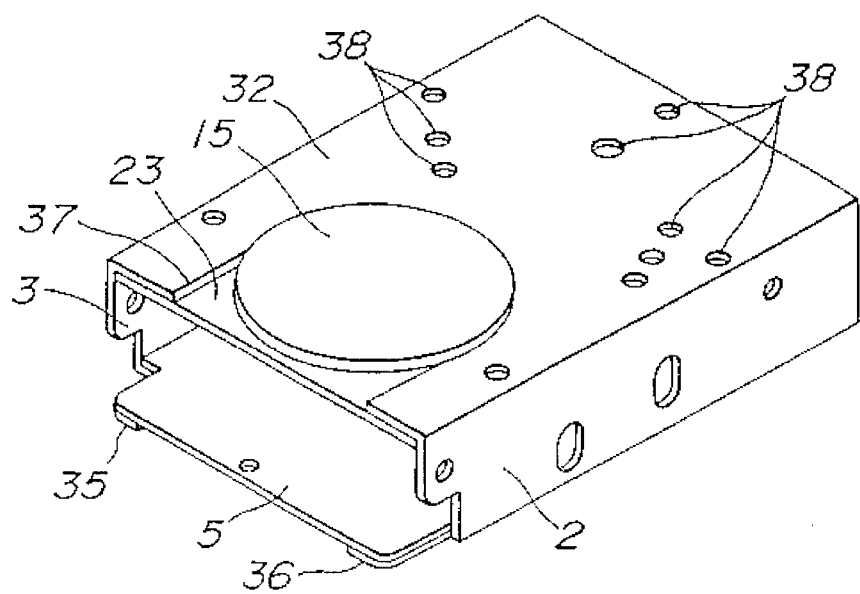
FIG. 6 is a view similar to FIG. 5, showing the dust shield cover as viewed from the bottom thereof.
Figure 7:
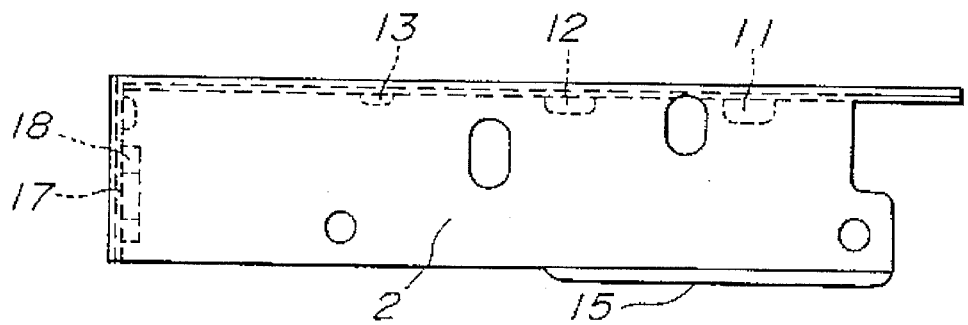
FIG. 7 is a side view showing the dust shield cover as viewed from the left thereof.
Figure 8:
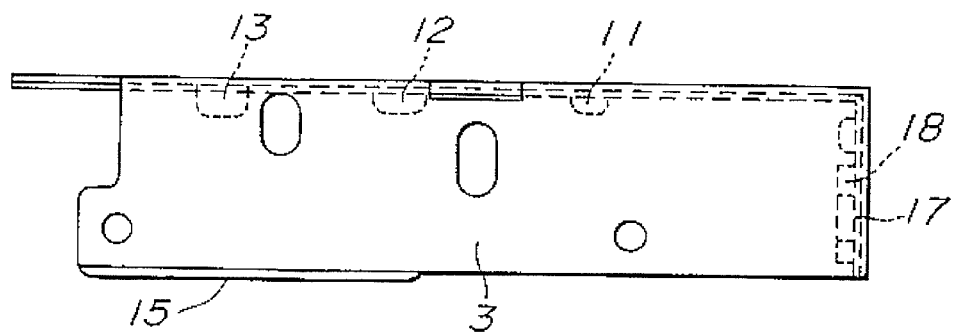
FIG. 8 is a side view showing the dust shield cover as viewed from the right thereof.

Referring to FIGS. 1 and 6, the lower dust shield plate 6 has a see-through window 15 formed at a position corresponding to a spindle motor 141 of the disk drive.

A portion of the see-through window 15 is in the form of a concavity 16 which can receive a stator yoke, etc. of the spindle motor.

Figure 5:
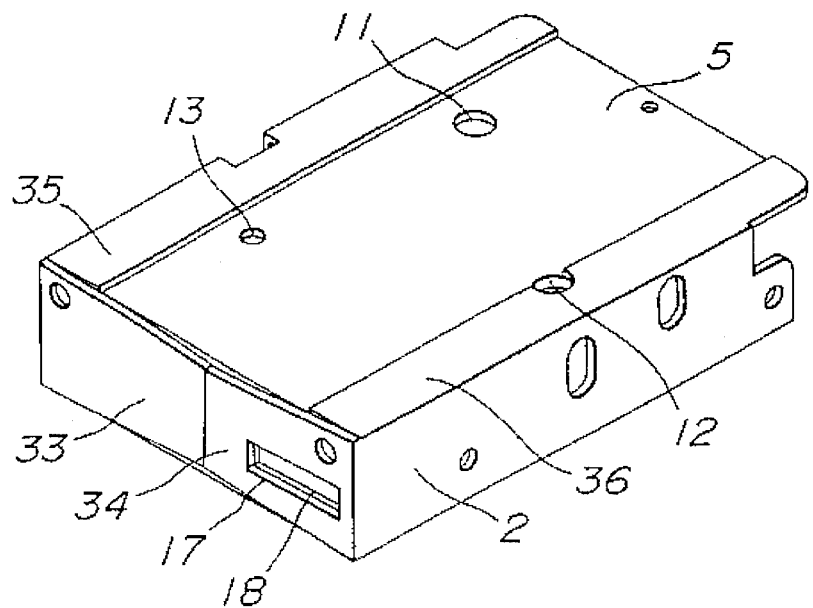
FIG. 5 is a perspective view showing the dust shield cover as viewed from the rear thereof.

As best seen in FIGS. 1 and 5, a recess 17 is formed in the real dust shield plate 4 at a position corresponding to a connector of the disk drive, and a seal member 18 made of foaming resin is arranged on a periphery of the recess 17 so as to closely contact a periphery of the connector to carry out a sealing between the connector and the rear dust shield plate 5.

Figure 4:
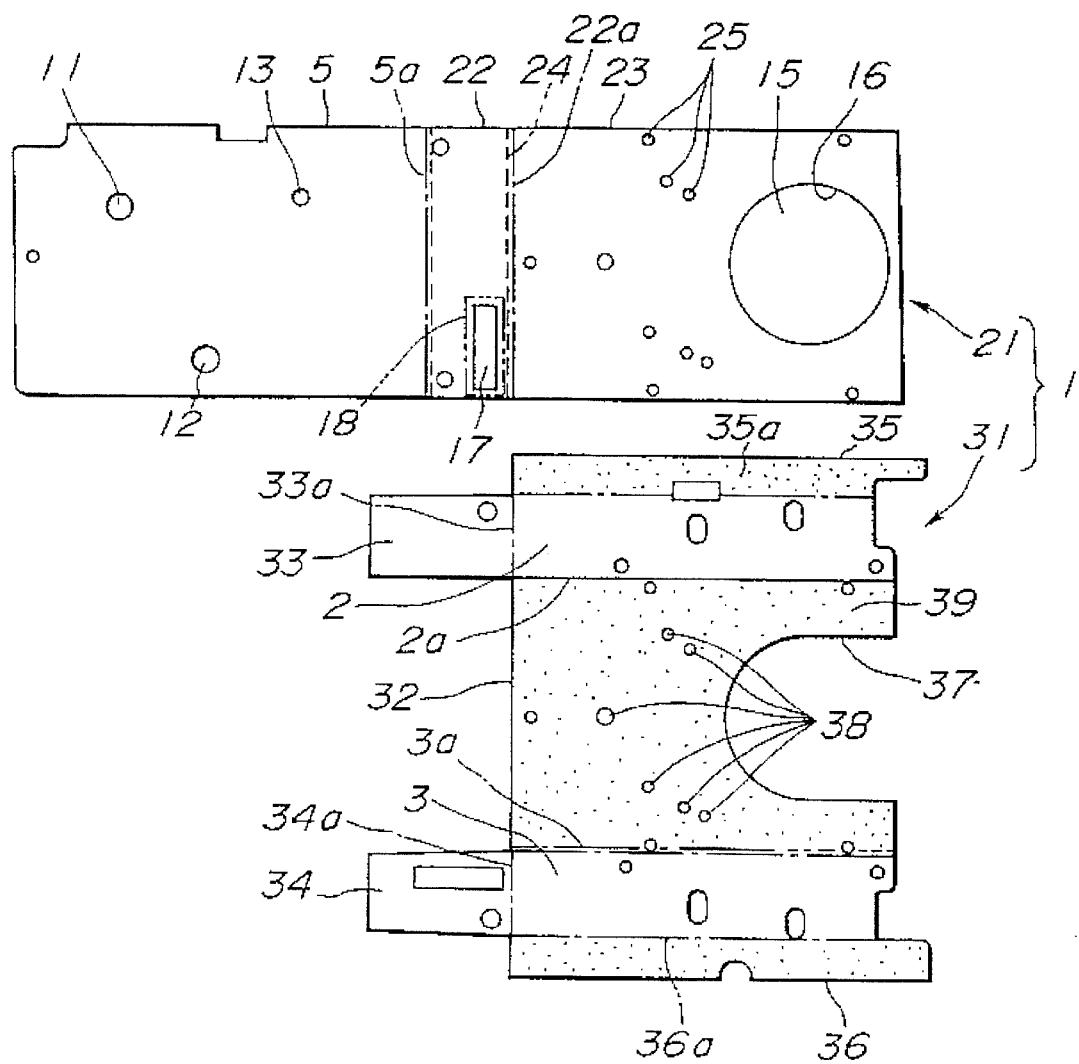
FIG. 4 is a development showing the dust shield cover.

Referring to FIG. 4, the dust shield cover 1 is formed by two seat-like synthetic resin members which are different in thickness: a first cover constituent member 21 of 0.2 mm thickness and a second cover constituent member 31 of 0.1 mm thickness.

The first cover constituent member 21 includes a first rear plate portion portion 22 which constitutes the rear dust shield plate 4 together with second and third rear plate portions 33, 34 of the second cover constituent member 31 as will be described next, and a first lower plate portion 23 which is connected to the upper dust shield plate 5 connected to one side (the left as viewed in FIG. 4) of the first rear plate portion 22 and another side (the right as viewed in FIG. 4), and constitutes the lower dust shield plate 6 together with a second lower plate portion 32 of the second cover constituent member 31.

The first rear plate portion 22 is formed with the recess 17, and has a double side adhesive tape 24 placed on a rear face thereof.

Figure 10:
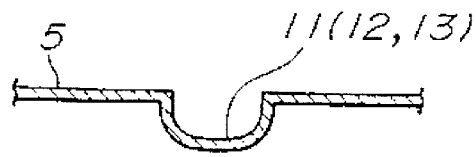
FIG. 10 is a sectional view showing a rear dust shield plate with a protrusion.

Referring also to FIG. 10, the first, second and third protrusions 11–13 are arranged on the upper dust shield plate 5.

The first lower plate portion 23 has the see-through window 15 as the concavity 16, and a plurality of small holes 25 . . . 25 for performance inspection of the disk drive.

On the other hand, referring always to FIG. 4, the second cover constituent member 31 includes the second lower plate portion 32 which constitutes the lower dust shield plate 6 together with the first lower plate portion 23 of the first cover constituent member 21, the left and right side dust shield plates 2, 3 connected to both sides (the upper and lower sides as viewed in FIG. 4) of the second lower plate portion 32, and a second and third rear plate portions 33, 34 which constitute the rear plate 4 together with the first rear dust shield plate portion 22 of the first cover constituent member 21.

Figure 9:
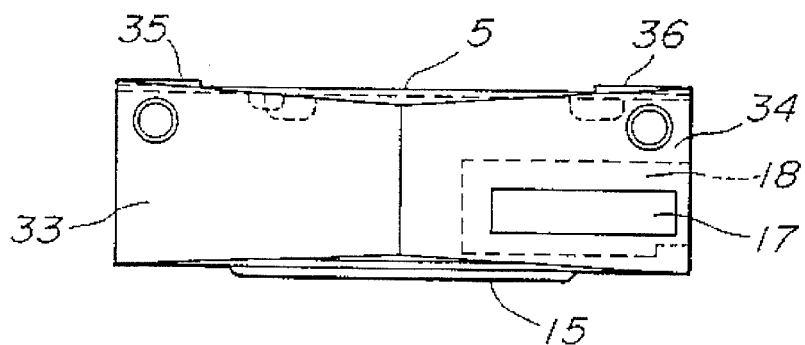
FIG. 9 is a rear view showing the dust shield cover.

Referring also to FIG. 9, connection overlaps 35, 36 are disposed on one side (the upper/lower side as viewed in FIG. 4) of each of the left and right side dust shield plates 2, 3.

As best seen in FIG. 6, the recess 37 is formed in the second lower plate portion 32 at a position corresponding to the concavity 16 arranged in the first lower plate portion 23 of the first cover constituent member 21, and a plurality of small holes 38 . . . 38 at positions corresponding to the plurality of small holes 25 . . . 25.

A double side adhesive tape 39 is placed on a surface of the second lower plate portion 32.

By using the double side adhesive tape 39, the first lower plate portion 23 of the first cover constituent member 21 as superimposed on the second lower plate portion 32 of the second cover constituent member 31 are joined each other, thus constructing the first lower dust shield plate 6.

Next, referring particularly to FIG. 4, the rear plate portion 22 of the first cover constituent member 21 is bent at right angles along a bend line 22a to stand vertically.

The left and right side dust shield plates 2, 3 of the second cover constituent member 31 are bent at right angles along bend lines 2a, 3a to stand vertically, whereas the second and third rear plate portions 33, 34 of the second cover constituent member 31 are bent at right angles and inward along bend lines 33a, 34a, then superimposed on the first rear plate portion 22 of the first cover constituent member 21, and joined each other by the double side adhesive tape 24, thus constructing the rear dust shield plate 4. The seal member 18 is placed on the periphery of the recess 17 for the connector.

Then, the upper dust shield plate 5 of the first cover constituent member 21 is bent at right angles and horizontally along a bend line 5a, whereas the connection overlaps 35, 36 of the second cover constituent member 31 are bent at right angles along bend lines 35a, 36a, and joined to the upper dust shield plate 5 by a double side adhesive tape, thus constructing the dust shield cover 1.

In this embodiment, the dust shield cover 1 is formed by the first and second cover constituent members 21, 31 which are different in thickness. This is because of minimizing a width dimension of the dust shield cover 1, and providing a sufficient mechanical strength to the upper shield plate 5.

Referring again to FIG. 1, an electromagnetic shield cover 41 is arranged, which can be mounted over the dust shield cover 1.

The dust shield cover 1 is constructed as described above, so that when inserting the disk drive into the cover 1, the stator yoke, etc. of the spindle motor of the disk drive are received in the concavity arranged in the lower shield plate 6, and thus the disk drive is housed in a positioned state in the dust shield cover 1.

The disk drive is concealed by the dust shield cover, and has faces covered by the dust shield plates except the front, obtaining a protection from outside dust, etc.

Since the dust shield plates of the dust shield cover serve to conceal the left and right sides, the rear, and the upper and lower sides of the disk drive, a penetration of dust, etc. from the left and right sides, the rear, and the upper and lower sides of the disk drive can surely be prevented by the dust shield plates.

Further, the dust shield plates of the dust shield cover can prevent air from passing through the disk drive, so that even when the disk drive is built in the work station for its utilization, outside air with dust, etc. can be prevented from entering the disk drive from the cassette insertion opening by the cooling fan of the work station.

Furthermore, the dust shield cover includes dust shield plates made of synthetic resin with antistatic finish, enabling a prevention of generation of static electricity, and sticking of dust, etc. on the dust shield plates by static electricity.

Still further, since the dust shield cover is formed in a flat box, the dust shield cover is easy to handle, i.e., a simple inserting operation of the disk drive thereinto enables a covering of the disk drive by the dust shield plates.

Further, since the dust shield cover 1 is constructed so that the ends of the protrusions of the upper dust shield plate contact the non-slide portions of the disk drive, the portions of the upper dust shield plate other than the protrusions fail to contact the slide portions of the disk drive such as the upper head arm, shutter closing arm, etc., enabling a sure slide operation of such slide portions.

Still further, since the dust shield cover is formed with the see-through window so as to correspond to the spindle motor, various indications of the spindle motor such as a type, performance, etc. can be confirmed through the window.

Furthermore, since the dust shield cover is formed with the concavity so as to correspond to the spindle motor, the dust shield cover can receive the spindle motor which protrudes toward the dust shield cover, and carries out a positioning thereof with respect to the dust shield cover.

Still further, since the dust shield cover is formed with the recess so as to correspond to the connector of the disk drive, a connection with the connector can be carried out through the recess with the dust shield cover disposed. Moreover, the seal member is disposed on the periphery of the recess to carry out a sealing between the recess and the connector, surely preventing a penetration of dust, etc. through the recess.

Having described the present invention in connection with the preferred embodiment, it is to be noted that the present invention is not limited thereto, and various changes and modifications are possible without departing from the spirit of the present invention.

What is claimed is:

1. A dust shield cover for a disk drive, comprising:

a first cover member having a first rear plate portion, an upper plate, a first lower plate portion, a first bend line, and a second bend line, the first rear plate portion being connected to the upper plate and the first lower plate portion, the first rear plate portion being a substantially flat plate, the first cover member being bent along the first and second bend lines, and the upper plate and the first lower plate portion being connected to the first rear plate portion along the first and second bend lines, respectively;

a second cover member having side plates, a second rear plate portion, a third rear plate portion, and a second lower plate portion, the side plates being connected to the second lower plate portion and being arranged to conceal the disk drive on both sides thereof, the second and third rear plate portions being connected to at least one of the second lower plate portion and the side plates;

the first cover member being connected to the second cover member, the first rear plate portion being connected to the second and third rear plate portions to form a rear plate arranged to conceal the disk drive on the rear side thereof; and the first lower plate portion being connected to the second lower plate portion to form a lower plate, the upper and lower plates being arranged to conceal the disk drive at upper and lower sides thereof.

2. A dust shield cover as claimed in claim 1, wherein: said side plates, said rear plate, said upper plate, and said lower plate are made of a synthetic resin having an antistatic finish.

3. A dust shield cover as claimed in claim 1, wherein: said first cover member has a different thickness than said second cover member.

4. A dust shield cover as claimed in claim 3, wherein: said first cover member has a 0.2 mm thickness and said second cover member has a 0.1 mm thickness.

5. A dust shield cover as claimed in claim 1, wherein: said side plates, said rear plate, said upper plate, and said lower plate are connected to each other so as to define a box.

6. A dust shield cover as claimed in claim 1, wherein: said upper plate has at least one protrusion protruding toward the disk drive, said at least one protrusion having an end adapted to contact a non-slide portion of the disk drive to maintain a spacing between other portions of said upper plate and a slide portion of the disk drive.

7. A dust shield cover as claimed in claim 1, wherein: said lower plate is formed with a see-through window positioned to correspond to a spindle motor of the disk drive so that the spindle motor may be observed through the see-through window.

8. A dust shield cover as claimed in claim 1, wherein: said lower plate is formed with a concavity positioned to correspond to a spindle motor of the disk drive.

9. A dust shield cover as claimed in claim 1, wherein: said rear plate is formed with a recess positioned to correspond to a connector of the disk drive.

10. A dust shield cover as claimed in claim 9, wherein said rear plate has a seal member attached to a periphery of the recess for sealing a space between said connector and said periphery of the recess.

11. In an arrangement:

a disk drive;

an electromagnetic shield cover disposed over said disk drive; and a dust shield cover interposed between said disk drive and said electromagnetic shield cover, said dust shield cover comprising:

a first cover member having a first rear plate portion, an upper plate and a first lower plate portion, the first rear plate portion being connected to the upper plate and the first lower plate portion, the upper plate having an exterior surface;

a second cover member having side plates, a second rear plate portion, a third rear plate portion, and a second lower plate portion, the side plates being connected to the second lower plate portion and being arranged to conceal the disk drive on both sides thereof, the second and third rear plate portions being connected to at least one of the second lower plate portion and the side plates, the second cover member having connection overlaps contacting the upper plate and being connected to the side plates along bend lines, the connection overlaps overlapping the exterior surface of the upper plate;

the first cover member being connected to the second cover member, the first rear plate portion being connected to the second and third rear plate portions to form a rear plate arranged to conceal the disk drive on the rear side thereof; and the first lower plate portion being connected to the second lower plate portion to form a lower plate, the upper and lower plates being arranged to conceal the disk drive at upper and lower sides thereof.

12. An arrangement as claimed in claim 11, wherein: said side plates, said rear plate, said upper plate, and said lower plate are made of a synthetic resin having an antistatic finish.

13. An arrangement as claimed in claim 11, wherein: said first cover member has a different thickness than said second cover member, said first cover member and said second cover member being bent along bend lines to construct the dust shield cover.

14. An arrangement as claimed in claim 13, wherein: said first cover member has a 0.2 mm thickness and said second cover member has a 0.1 mm thickness.

15. An arrangement as claimed in claim 11, wherein: said side plates, said rear plate, said upper plate, and said lower plate are connected to each other so as to define a box.

16. An arrangement as claimed in claim 11, wherein: said upper plate has at least one protrusion protruding toward the disk drive, said at least one protrusion having an end adapted to contact a non-slide portion of the disk drive to maintain a spacing between other portions of said upper plate and a slide portion of the disk drive.

17. An arrangement as claimed in claim 11, wherein: said lower plate is formed with a see-through window positioned to correspond to a spindle motor of the disk drive so that the spindle motor may be observed through the see-through window.

18. An arrangement as claimed in claim 11, wherein: said lower plate is formed with a concavity positioned to correspond to a spindle motor of the disk drive.

19. An arrangement as claimed in claim 11, wherein: said rear plate is formed with a recess positioned to correspond to a connector of the disk drive.

20. An arrangement as claimed in claim 19, wherein: said rear plate has a seal member attached to a periphery of the recess for sealing a space between said connector and said periphery of the recess.

* * * * *